United States Patent
Taneja

(10) Patent No.: US 10,237,733 B2
(45) Date of Patent: Mar. 19, 2019

(54) BEHAVIORAL AUTHENTICATION

(71) Applicant: salesforce.com, inc., San Francisco, CA (US)

(72) Inventor: Vikas Taneja, Redmond, WA (US)

(73) Assignee: salesforce.com, inc, San Francisco, CA (US)

( * ) Notice: Subject to any disclaimer, the term of this patent is extended or adjusted under 35 U.S.C. 154(b) by 10 days.

(21) Appl. No.: 15/215,015

(22) Filed: Jul. 20, 2016

(65) Prior Publication Data

US 2018/0027411 A1  Jan. 25, 2018

(51) Int. Cl.
*H04L 29/06* (2006.01)
*H04W 12/06* (2009.01)
*G06F 21/31* (2013.01)

(52) U.S. Cl.
CPC .......... *H04W 12/06* (2013.01); *G06F 21/316* (2013.01); *H04L 63/107* (2013.01); *G06F 2221/2111* (2013.01)

(58) Field of Classification Search
CPC ....... H04W 12/06; H04W 12/08; G06F 21/36; G06F 21/316
USPC .......................................................... 726/9
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |

(Continued)

OTHER PUBLICATIONS

Sharma, Seema. "Location based authentication." (2005).*
U.S. Appl. No. 13/986,251, filed Apr. 16, 2013.

*Primary Examiner* — Syed A Zaidi
(74) *Attorney, Agent, or Firm* — Dergosits & Noah LLP; Todd A. Noah

(57) ABSTRACT

Behavioral authentication is described. A mobile device records a first location of the mobile device. The mobile device records a second location of the mobile device. The mobile device determines whether a route from the first location to the second location matches an expected route. The mobile device generates an access-enabling token in response to a determination that the route from the first location to the second location matches the expected route. The mobile device enables access to an entity by a user of the mobile device based on the mobile device providing the access-enabling token to the entity.

17 Claims, 7 Drawing Sheets

(56) References Cited

U.S. PATENT DOCUMENTS

| | | |
|---|---|---|
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0255005 A1* | 12/2004 | Spooner ............ G06F 17/30569 709/218 |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2012/0100869 A1* | 4/2012 | Liang .................... H04W 4/02 455/456.1 |
| 2012/0233137 A1 | 9/2012 | Jakobson et al. |
| 2013/0218948 A1 | 8/2013 | Jakobson |
| 2013/0218949 A1 | 8/2013 | Jakobson |
| 2013/0218966 A1 | 8/2013 | Jakobson |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0172563 A1 | 6/2015 | Jakobson et al. |
| 2016/0189161 A1* | 6/2016 | Eramian .......... G06Q 20/40145 705/44 |
| 2016/0337369 A1* | 11/2016 | Sanso ................ H04L 67/1097 |

\* cited by examiner

BEHAVIORAL AUTHENTICATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Two-factor authentication is a method of confirming a user's claimed identity by utilizing a combination of two different components, or two different factors. These factors may be something that the user knows and something that the user possesses. The use of two-factor authentication to prove one's identity is based on the premise that an unauthorized actor is unlikely to be able to supply both factors required for access. If, in an authentication attempt, at least one of the factors is missing or supplied incorrectly, the user's identity is not established with sufficient certainty, and access to an asset, such as a building or data, being protected by two-factor authentication then remains blocked. One example is the withdrawing of money from a cash machine. Only the correct combination of a bank card, that the user possesses, and a PIN, a personal identification number that the user knows, allows the transaction to be carried out.

A major drawback of two-factor authentication is that the factor that the user possesses, such as a bank card or a universal serial bus (USB) stick, must be carried around by the user at all times. Mobile device two-factor authentication was developed to avoid this issue. This approach uses mobile devices such as mobile phones and wearable computers to serve as the something that the user possesses. If users want to authenticate themselves, they can use their personal access license, something that only the individual user knows, plus a one-time-valid, dynamic passcode consisting of digits. The passcode can be sent to their mobile device by SMS (short message service) or via a special application. The advantage of this method is that there is no need for an additional, dedicated factor, as users tend to carry their mobile devices around at all times anyway. Some two-factor authentication solutions also ensure that there is always a valid passcode available for users. If a user has already used a passcode, this passcode is automatically deleted and the system sends a new passcode to the mobile device. And if the new passcode is not entered within a specified time limit, the system automatically replaces it. This ensures that no old, already used passcodes are left on mobile devices.

Security of the mobile-delivered security tokens fully depends on the mobile operator's operational security, and can be easily breached by wiretapping. Text messages to mobile devices using SMS are insecure and can be intercepted, such that a passcode can thus be stolen and used by third parties. The mobile device must be kept in range of a cellular network whenever authentication is necessary, such that access may be impossible if the mobile device is unable to display messages. Text messages may not be delivered instantly, adding additional delays to the authentication process. Since modern mobile phones are used for receiving email and SMS, with email usually always logged in, if a mobile phone is lost or stolen, all accounts for which the email is the key can be hacked because the mobile phone can receive the second factor. Since mobile phones combine the two factors into one factor, stolen mobile phones can potentially allow a thief to gain access into the user's accounts.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Figure 1:
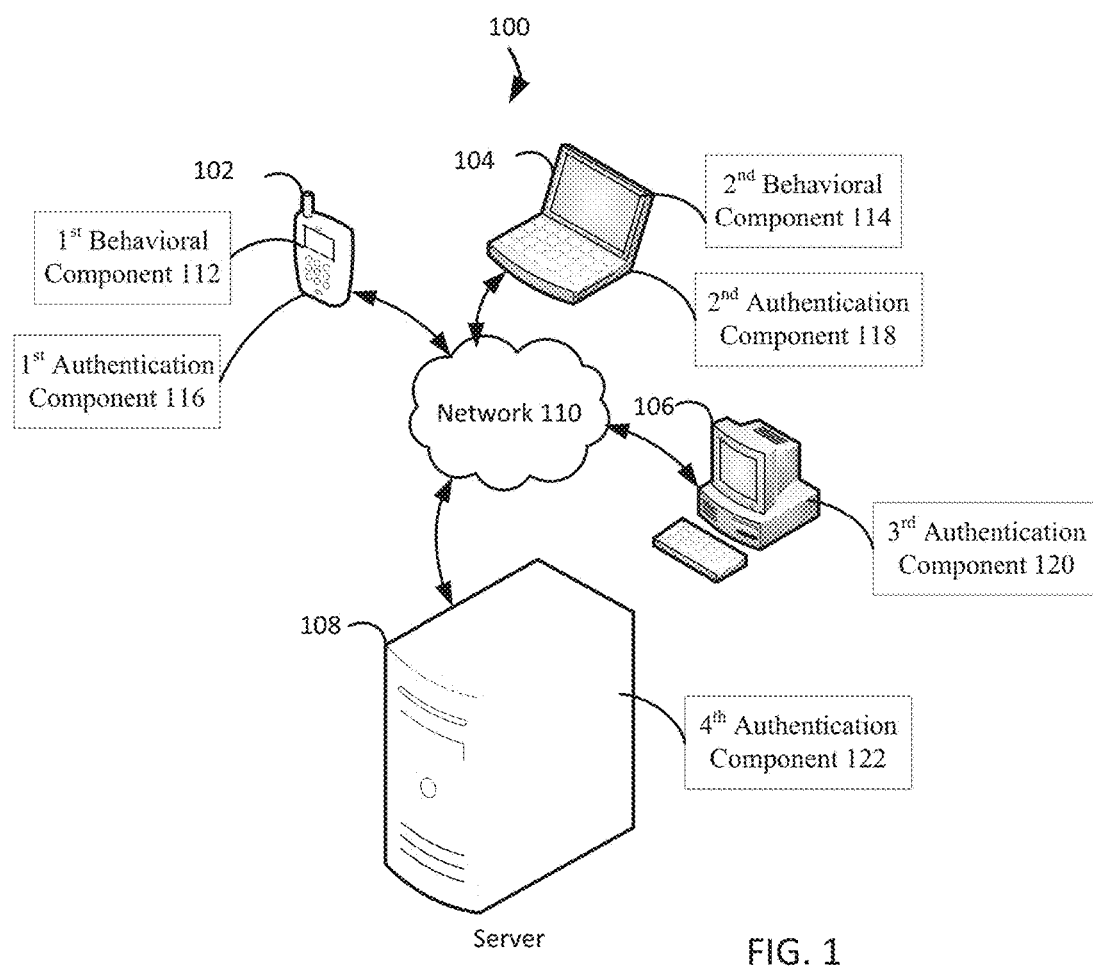
FIG. 1 illustrates a block diagram of an example system for behavioral authentication, under an embodiment.

In accordance with embodiments described herein, there are provided methods and systems for behavioral authentication. A mobile device records a first location of the mobile device. The mobile device records a second location of the mobile device. The mobile device determines whether a route from the first location to the second location matches an expected route. The mobile device generates an access-enabling token if the route from the first location to the second location matches the expected route. The mobile device enables a user of the mobile device to access to an entity based on the mobile device providing the access-enabling token to the entity.

For example, a mobile phone records the location of the mobile phone at 8:20 A.M at the user's home, records the location of the mobile phone at 8:50 A.M at the parking garage for the user's office, and records the location of the mobile phone at 8:55 A.M. at the user's desk at work. The mobile phone calculates a matching score of 95% between the route from the user's home to the parking garage to the desk and an expected route from the user's home at 8:15 A.M. to the parking garage at 8:45 A.M. to the desk at 8:50 A.M. The mobile phone generates an access-enabling token because the matching score of 95% between the actual route and the expected route satisfies a confidence score threshold of 90%. The mobile phone provides the access-enabling token to the desktop computer at the user's desk, which enables the mobile phone's user to access this desktop computer.

Even if the mobile device is unable to display messages when authentication is necessary because the mobile device is outside the range of a cellular network, access to the desired entity is still possible. Since no insecure message is sent to the mobile device, no passcode can thus be stolen and used by others. Since the mobile device does not wait to receive a message when authentication is necessary, no additional delays are added to the authentication process. If a mobile phone is stolen with the email still logged in, a thief still cannot access the desired entity even in the extremely unlikely event that the thief knows the exact route that the user takes before accessing the desired entity. The thief would still have to begin the route at the user's home at the approximate time the user normally leaves, when the user would be highly likely to see the thief, the thief would still have to arrive at the same intermediate locations at the approximate times that the user normally arrives at these intermediate locations, and the thief would still have to end the route at the user's desk at approximately the time when the user normally arrives, when the user and/or the user's co-workers would be highly likely to see the thief.

Systems and methods are provided for a behavioral authentication. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. Next, mechanisms and methods for behavioral authentication will be described with reference to example embodiments.

While one or more implementations and techniques are described with reference to an embodiment in which behavioral authentication is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

FIG. 1 illustrates a block diagram of a system 100 for behavioral authentication, under an embodiment. In an embodiment, the system 100 includes a first mobile device 102, a second mobile device 104, and a computer 106, and a server 108 that may be provided by a hosting company. Although the mobile devices 102-104 are depicted in FIG. 1 as a mobile phone 102 and a laptop computer 104, the mobile devices 102-104 may be any type of mobile devices, such as wearable computers or other devices described in more detail below with reference to FIGS. 4-8. While the computer 106 is depicted in FIG. 1 as a desktop computer 106, the computer 106 may be any type of computer. The server 108 is described in more detail below with reference to FIGS. 7-8. The mobile devices 102-104, the computer 106, and the server 108 communicate via a network 110. The first mobile device 102 includes a first behavioral component 112 and the second mobile device 104 includes a second behavioral component 114, as described in further detail below. Additionally, the first mobile device 102 includes a first authentication component 116, the second mobile device 104 includes a second authentication component 118, the computer 106 includes a third authentication component 120, and the server 108 includes a fourth authentication component 122, as described in further detail below. Although FIG. 1 depicts the system 100 with two mobile devices 102-104, one computer 106, one server 108, one network 110, two behavioral components 112-114, and four authentication components 116-122, the system 100 may include any number of mobile devices 102-104, any number of computers 106, any number of servers 108, any number of networks 110, any number of behavioral components 112-114, and/or any number or authentication components 116-122.

Figure 2:
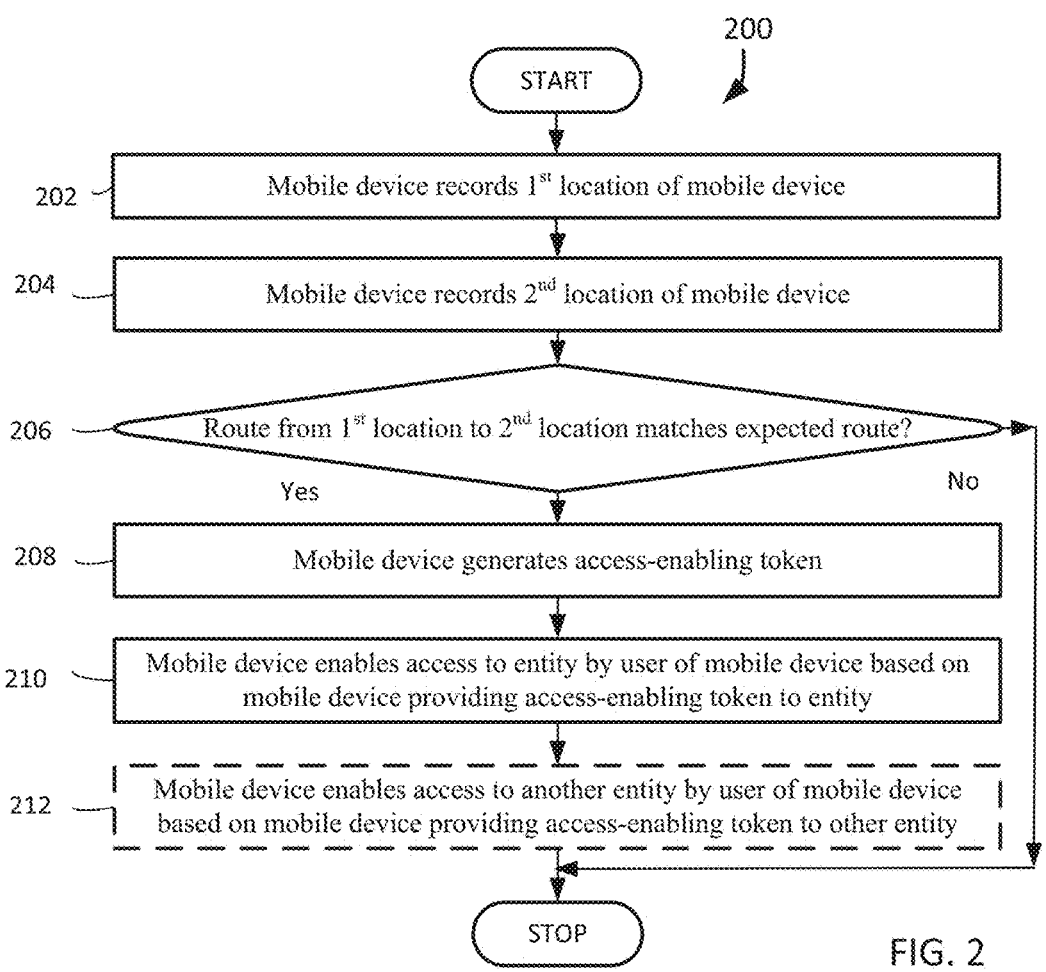
FIG. 2 is a flowchart that illustrates a method for behavioral authentication, under an embodiment.

FIG. 2 depicts an operational flow diagram illustrating a high level overview of a method 200 for behavioral authentication. After a mobile device has completed a learning phase, during which the mobile device learns the route that the mobile device is expected to take, the mobile device begins the authentication phase, during which the mobile device will generate an access-enabling token if the mobile device takes the expected route. An example of a mobile device learning an expected route during the learning phase is described below in reference to FIG. 3. A mobile device records the mobile device's first location, block 202. For example and without limitation, this can include the first behavioral component 112 recording the location of the mobile phone 102 at 8:20 A.M at the home of the user of the mobile phone 102. The first behavioral component 112 may use a global positioning system (GPS), triangulation, Wi-Fi, or any location service to record the location of the mobile phone 102. The first behavioral component 112 may also altimeter incorporated into the mobile device to determine the elevation of the mobile device, such as floor of a house or office building.

The mobile device 102 may record its location each time that the mobile device 102 is stationary for longer than a specified time, such as one minute, which enables the mobile device 102 to record the locations of checkpoints, which are intermediate stopping locations along a route, without recording the locations of inconsequential stopping locations, such as every stop sign along a driving route. Examples of checkpoints are described below in reference to FIG. 3.

After recording a mobile device's first location, the mobile device records the mobile device's second location, block 204. By way of example and without limitation, this can include the first behavioral component 112 recording the location of the mobile phone 120 at 8:50 A.M at the parking garage for the user's office, and the location of the mobile phone 120 at 8:55 A.M. at the user's desk at work. The location of the mobile phone 120 may be determined using, for example, GPS coordinates and/or elevation data recorded by the phone, which would map to the user's parking spot in the basement of the parking garage for the user's office building for the starting location and to the user's office located on the 9$^{th}$ floor of the user's office building for the ending location. Although this example describes the mobile device 102 recording one checkpoint on a route between its starting location and its ending location, the mobile device 102 can record any number of checkpoints on the route between its starting location and its ending location. An example of eight checkpoints is described below in reference to FIG. 3.

Having recorded a mobile device's first and second locations, the mobile device determines whether the route from the first location to the second location matches an expected route, block 206. In embodiments, this can include the first behavioral component 112 calculating a matching score of 95% between the route from the user's home to the parking garage to the desk and an expected route from the user's home at 8:15 A.M. to the parking garage at 8:45 A.M. to the desk at 8:50 A.M. The matching score of 95% may be based on the actual departure time from the user's home being only 5 minutes later than the expected departure time from the user's home, the actual arrival time at the parking garage being only 5 minutes later than the expected arrival time at the parking garage, the actual arrival time at the user's desk being only 5 minutes later than the expected arrival time at the user's desk. The matching score may also be based on error criteria for the departure time, the arrival time, and any intermediate times, such as the expected time spent waiting to take a subway. The matching score is an indication of the confidence level that the recorded locations are based upon the route taken by the owner of the mobile device since there is a high degree of similarity between the recorded route and the expected route.

The matching score of 95% may be further based on the actual travel time from the user's home to the parking garage being the same 30 minutes as the expected travel time from the user's home to the parking garage, and the actual travel time from the parking garage to the user's desk being the same 5 minutes as the expected travel time from the parking garage to the user's desk. The matching score of 95% may be additionally based on the location of the actual starting point at the user's home being substantially the same as the location of the expected starting point at the user's home, the location of the actual checkpoint at the parking garage being substantially the same as the location of the expected checkpoint at the parking garage, and the location of the actual ending point at the user's desk being substantially the same as the location of the expected ending point at the user's desk. Even if the location of the actual starting point at the user's home is substantially the same as the location of the expected starting point at the user's home, and the location of the actual ending point at the user's desk is substantially the same as the location of the expected ending point at the user's desk, the matching score may be relatively low if the locations of the actual checkpoint(s) in the expected route are not substantially the same as the location of the expected checkpoint(s) in the expected route. An example of the mobile device 102 learning an expected route is described below in reference to FIG. 3.

If the route from the first location to the second location matches an expected route, the method 200 continues to block 208 to generate an access-enabling token. If the route from the first location to the second location does not match an expected route, the method 200 terminates.

If the route from a mobile device's first location to its second location matches an expected route, the mobile device generates an access-enabling token, block 208. For example and without limitation, this can include the first authentication component 116 generating an encrypted access-enabling token, without requiring any external communication, because the matching score of 95% between the actual route and the expected route satisfies a matching score threshold of 90%. Although these examples describe the first behavioral component 112 in the mobile device 102 executing some actions and the first authentication component 116 in the mobile device 102 executing other actions, either component may execute some or all of the other component's actions.

Having generated an access-enabling token, a mobile device enables a user of the mobile device to access an entity based on the mobile device providing the access-enabling token to the entity, block 210. By way of example and without limitation, this can include the first authentication component 116 using a proprietary protocol with encryption to provide the access-enabling token to the third authentication component 120 via a pre-existing channel for the desktop computer 106 at the user's desk, which enables the mobile phone's user to access the desktop computer 106 at the user's desk. The proprietary protocol used by a mobile device's authentication component to provide the access-enabling token to an entity's authentication component may be Wi-Fi, Bluetooth, near field communication, or the Internet, if the destination entity is discoverable via the Internet, or another proprietary protocol. The mobile device 102 may use a standard error mechanism such as retry upon failure to handle error scenarios such as failure to communicate with the remote entity, drop of connection, out of scope, etc. Instead of the first behavioral component 112 and the first authentication component 116 of the mobile phone 102 enabling a user of the mobile phone 102 to access the desktop computer 106, the second behavioral component 114 and the second authentication component 118 of the laptop computer 104 can enable a user of the laptop computer 104 to access the desktop computer 106.

Having enabled access to an entity, a mobile device enables a user of the mobile device to access another entity based on the mobile device providing the access-enabling token to the other entity, block 212. In embodiments, this can include the first authentication component 116 using a proprietary protocol with encryption to provide the access-enabling token to the second authentication component 118 via a pre-existing channel for the laptop computer 104 at the user's desk, which enables the mobile phone's user to access the laptop computer 104 at the user's desk. In another example, the first authentication component 116 for the mobile phone 102 provides the access-enabling token to the third authentication component 120 for the desktop computer 106, which conveys the access-enabling token to the second authentication component 118 for the laptop computer 104 at the user's desk, which enables the mobile phone's user to access the laptop computer 104 at the user's desk. In yet another example, the first authentication component 116 for the mobile phone 102 provides the access-enabling token to the third authentication component 120 for the desktop computer 106, which conveys the access-enabling token to the fourth authentication component 122 for the server 108, which enables the mobile phone's user to use the desktop computer 106 to log in to the salesforce.com website provided by the server 108. In a further example, the first authentication component 116 for the mobile phone 102 provides the access-enabling token to the second authentication component 118 via a pre-existing channel for the laptop computer 104 at the user's desk only after the mobile device user provided a biometric authentication, such as a fingerprint that ensures that the mobile device user is the expected mobile device user, which enables the mobile phone's user to access the laptop computer 104 at the user's desk.

Even if the mobile device 102 is unable to display messages when authentication is necessary because the mobile device 102 is outside the range of a cellular network, access to the desired entity is still possible. Since no insecure message is sent to the mobile device 102, no passcode can thus be stolen and used by others. Since the mobile device 102 does not wait to receive a message when authentication is necessary, no additional delays are added to the authentication process. If the mobile phone 102 is stolen with the email still logged in, a thief still cannot access the desired entity even in the extremely unlikely event that the thief knows the exact route that the user takes before accessing the desired entity. The thief would still have to begin the route at the user's home at the approximate time the user normally leaves, when the user would be highly likely to see the thief, the thief would still have to arrive at the same intermediate locations at the approximate times that the user normally arrives at these intermediate locations, and the thief would still have to end the route at the user's desk at approximately the time when the user normally arrives, when the user and/or the user's co-workers would be highly likely to see the thief.

The method 200 may be repeated as desired. Although this disclosure describes the blocks 202-212 executing in a particular order, the blocks 202-212 may be executed in a different order. In other implementations, each of the blocks 202-212 may also be executed in combination with other blocks and/or some blocks may be divided into a different set of blocks.

Figure 3:
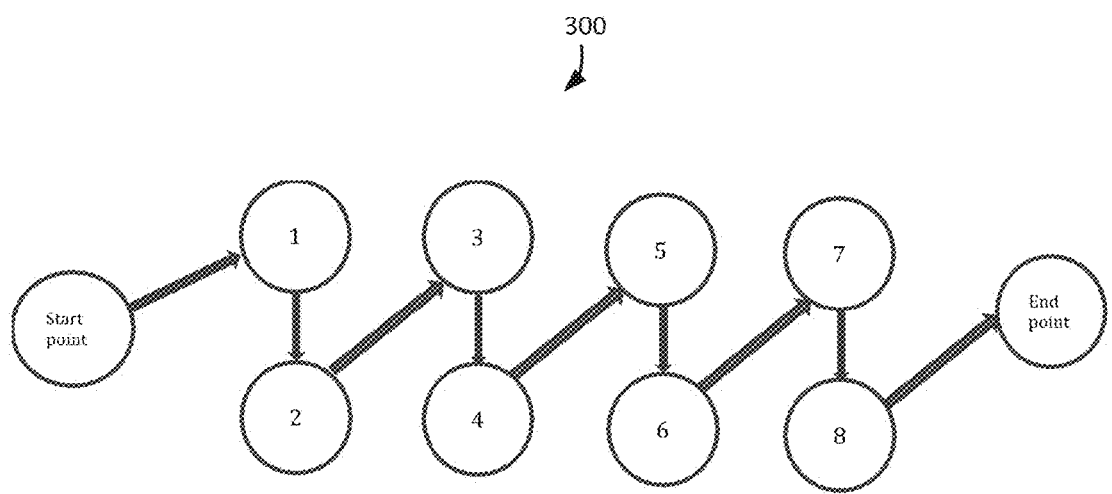
FIG. 3 is an example route diagram for behavioral authentication, under an embodiment.

FIG. 3. depicts an example route for behavioral authentication, under an embodiment. During the learning phase, the mobile device 102 may learn expected routes that precede access to an entity by using a global positioning system (GPS), triangulation, Wi-Fi, or any location service to record a sequence of locations of the mobile phone 102 traveling a route. For example, as depicted by route 300, the route 300 from a start point to an end point may be divided into 9 smaller sub-routes that are from one checkpoint to another checkpoint for the 8 checkpoints between the start point and the end point. The sub-routes are Start→1, 1→2, 2→3, 3→4, 4→5, 5→6, 6→7, 7→8, and 8→End, while the checkpoints are: 1, 2, 3, 4, 5, 6, 7, and 8. If the mobile device user takes the same route each day during the learning phase, and the mobile device 102 records a small variance as part of the learning process, the mobile device 102 will record the variances as checkpoints, and prompt the mobile device user to confirm the checkpoints. When confirming the checkpoints, the mobile device user has the option to add, modify, and/or delete checkpoints. The length of the learning phase may span across several days so that the mobile device 102 can identify at least one expected path that precedes access of an entity. The learning phase may be automated or started and stopped by the mobile device user.

The mobile device 102 may identify multiple routes between checkpoints, which can result in identifying multiple expected routes, each of which is processed by the mobile device 102 as a legitimate route. For example, the mobile device user may normally stop at checkpoint 5 to purchase a cup of coffee only on Tuesdays and Thursdays, and normally bypass checkpoint 5 by taking a route directly from checkpoint 4 to checkpoint 6 on Mondays, Wednesdays, and Fridays. After the learning phase is completed, the behavior required for authentication is established.

Subsequent to the previous example, if the mobile device user stops at checkpoint 5 on a Monday during the authentication phase, the mobile device 102 compares today's route to both expected routes, the Monday-Wednesday-Friday route, and the Tuesday-Thursday route, unless the mobile device user has instructed the mobile device 102 to identify the expected route based on the day of the week. If during the route from a start point to an end point the mobile device 102 fails to record some checkpoints for an expected route, the mobile device 102 adjusts the matching score accordingly.

In an example for which the sub-route between checkpoint 7 and checkpoint 8 includes stairs, the sub-route between checkpoint 8 and checkpoint 9 includes a long hallway, and the mobile device 102 is a smartwatch 102, the smartwatch 102 records the heartbeat of the user while walking up the stairs and down the hallway, records the speed and the number of steps while walking, and calculates a matching score based on comparing the actual heartbeat, speed, and number of steps against the expected heartbeat, speed, and number of steps for these sub-routes. Furthermore, the mobile device 102 can also record the height or altitude of a location using an altimeter or another mechanism for measuring the elevation of the mobile device at a particular location. Consequently, a mobile device thief would be denied access to a computer in the office of the mobile device user when the thief attempts to approximate the endpoint of an expected route by entering a basement that is 9 floors directly beneath the user's desk.

Figure 4:
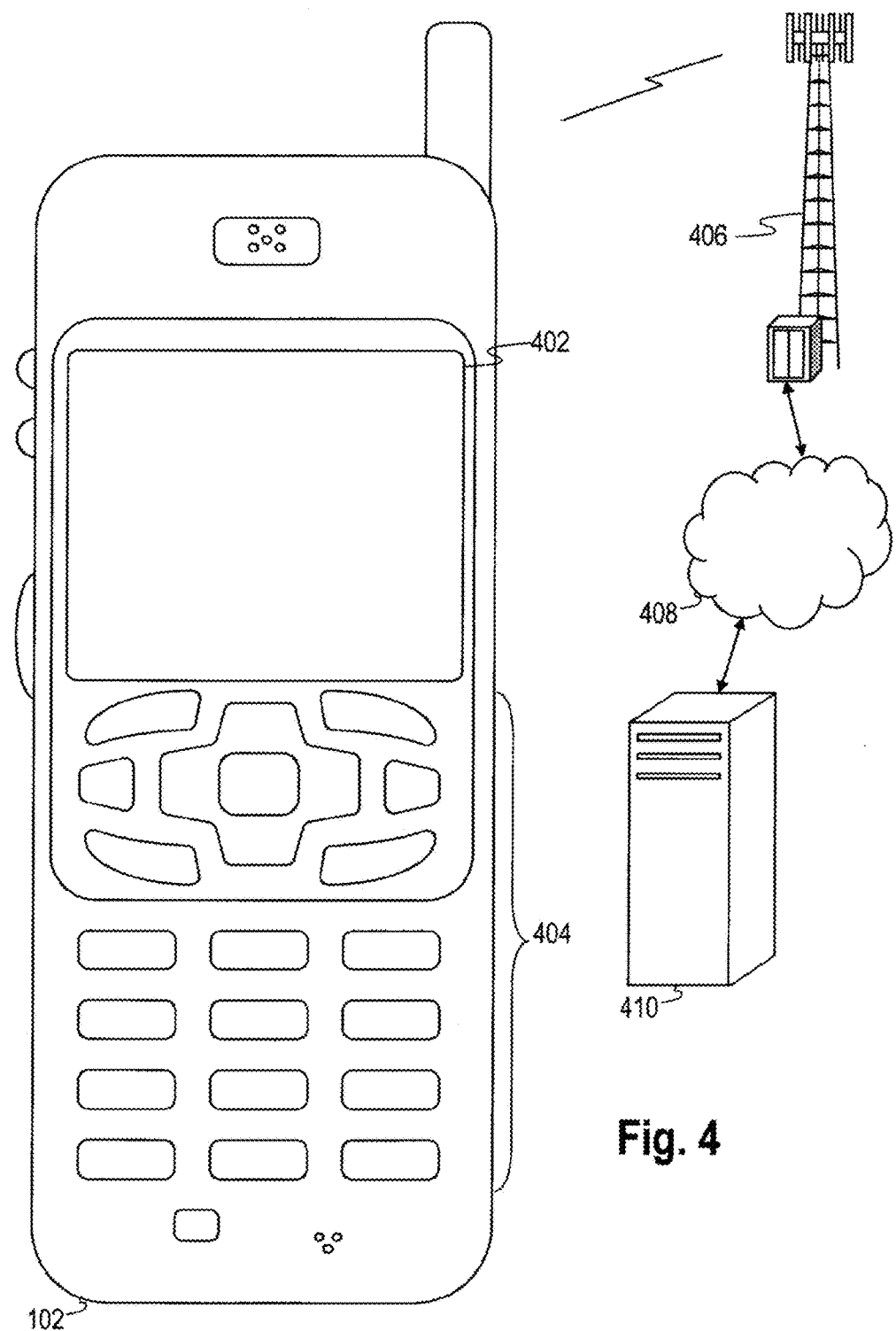
FIG. 4 shows a wireless communications system, under an embodiment.

FIG. 4 shows a wireless communications system including the mobile device 102, under an embodiment. FIG. 4 depicts the mobile device 102, which is operable for implementing aspects of the present disclosure, but the present disclosure should not be limited to these implementations. Though illustrated as a mobile phone, the mobile device 102 may take various forms including a wearable computer, a dual mode handset, a dual Subscriber Identification Module (SIM) phone, a wireless mobile device, a pager, a personal digital assistant (PDA), a portable computer, a tablet computer, a laptop computer, a digital camera, a digital music player, a digital calculator, and an electronic key fob for keyless entry. Many suitable mobile devices combine some or all of these functions.

The mobile device 102 includes a display 402 and a touch-sensitive surface or keys 404 for input by a user. The mobile device 102 may present options for the user to select, controls for the user to actuate, and/or cursors or other indicators for the user to direct, including options such as telephone numbers to dial. The mobile device 102 may further accept data entry from the user, including numbers to dial or various parameter values for configuring the operation of the mobile device 102. The mobile device 102 may further execute one or more software or firmware applications in response to user commands. These applications may configure the mobile device 102 to perform various customized functions in response to user interaction.

Among the various applications executable by the mobile device 102 may be a web browser, which enables the display 402 to show a web page. The web page may be obtained via wireless communications with a cell tower 406, or another wireless communications network or system. The cell tower 406 may be coupled to a wired network 408, such as the internet. Via the wireless link and the wired network, the mobile device 102 may have access to information on various servers, such as a content server 410. The content server 410 may provide content that may be shown on the display 402.

Figure 5:
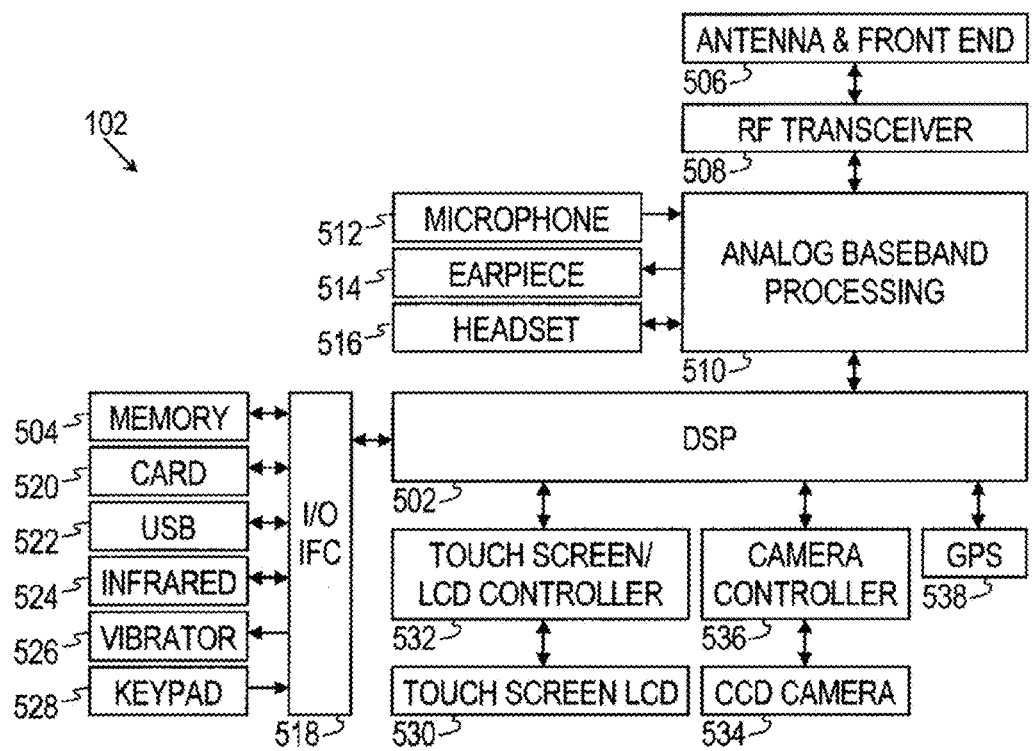
FIG. 5 shows a block diagram of a mobile device, under an embodiment.

FIG. 5 shows a block diagram of the mobile device 102, under an embodiment. The mobile device 102 includes a digital signal processor (DSP) 502 and a memory 504. As shown, the mobile device 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538.

The digital signal processor 502 or some other form of controller or central processing unit operates to control the various components of the mobile device 102 in accordance with embedded software or firmware stored in memory 504. In addition to the embedded software or firmware, the digital signal processor 502 may execute other applications stored in the memory 504 or made available via information carrier media such as portable data storage media like the removable memory card 520 or via wired or wireless network communications. The application software may comprise a compiled set of machine-readable instructions that configure the digital signal processor 502 to provide the desired functionality, or the application software may be high-level software instructions to be processed by an interpreter or compiler to indirectly configure the digital signal processor 502.

The antenna and front end unit 506 may be provided to convert between wireless signals and electrical signals, enabling the mobile device 102 to send and receive information from a cellular network or some other available wireless communications network. The radio frequency transceiver 508 provides frequency shifting, converting received radio frequency signals to baseband and converting baseband transmit signals to radio frequency. The analog baseband processing unit 510 may provide channel equalization and signal demodulation to extract information from received signals, may modulate information to create transmit signals, and may provide analog filtering for audio signals. To that end, the analog baseband processing unit 510 may have ports for connecting to the built-in microphone 512 and the earpiece speaker 514 that enable the mobile device 102 to be used as a cell phone. The analog baseband processing unit 510 may further include a port for connecting to a headset or other hands-free microphone and speaker configuration.

The digital signal processor 502 may send and receive digital communications with a wireless network via the analog baseband processing unit 510. In some embodiments, these digital communications may provide Internet connectivity, enabling a user to gain access to content on the Internet and to send and receive e-mail or text messages. The input/output interface 518 interconnects the digital signal processor 502 and various memories and interfaces. The memory 504 and the removable memory card 520 may provide software and data to configure the operation of the digital signal processor 502. Among the interfaces may be the universal serial bus interface 522 and the infrared port 524. The universal serial bus interface 522 may enable the mobile device 102 to function as a peripheral device to exchange information with a personal computer or other computer system. The infrared port 524 and other optional ports such as a Bluetooth interface or an IEEE 802.11 compliant wireless interface may enable the mobile device 102 to communicate wirelessly with other nearby mobile devices and/or wireless base stations.

The input/output interface 518 may further connect the digital signal processor 502 to the vibrator 526 that, when triggered, causes the mobile device 102 to vibrate. The vibrator 526 may serve as a mechanism for silently alerting the user to any of various events such as an incoming call, a new text message, and an appointment reminder.

The keypad 528 couples to the digital signal processor 502 via the interface 518 to provide one mechanism for the user to make selections, enter information, and otherwise provide input to the mobile device 102, including information entered such as telephone numbers to dial. Another input mechanism may be the touch screen liquid crystal display 530, which may also display text and/or graphics to the user. The touch screen liquid crystal display controller 532 couples the digital signal processor 502 to the touch screen liquid crystal display 530.

The charge-coupled device camera 534 enables the mobile device 102 to take digital pictures. The digital signal processor 502 communicates with the charge-coupled device camera 534 via the camera controller 536. The global positioning system sensor 538 is coupled to the digital signal processor 502 to decode global positioning system signals, thereby enabling the mobile device 102 to determine its position. Various other peripherals may also be included to provide additional functions, e.g., radio and television reception.

Figure 6:
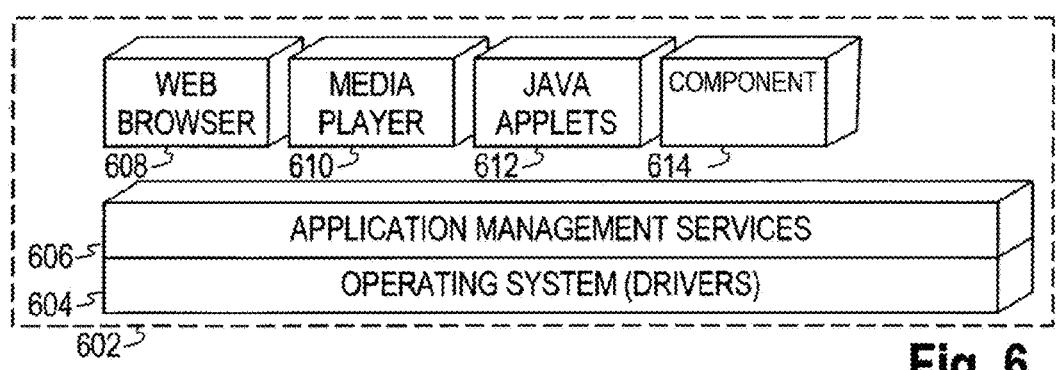
FIG. 6 illustrates a software environment, under an embodiment.

FIG. 6 illustrates a software environment 602 that may be implemented by the digital signal processor 502, under an embodiment. The digital signal processor 502 executes operating system drivers 604 that provide a platform from which the rest of the software operates. The operating system drivers 604 provide drivers for the mobile device hardware with standardized interfaces that are accessible to application software. The operating system drivers 604 include application management services 606 that transfer control between applications running on the mobile device 102. Also shown in FIG. 6 are a web browser application 608, a media player application 610, Java applets 612, and a component 614. The web browser application 608 configures the mobile device 102 to operate as a web browser, allowing a user to enter information into forms and select links to retrieve and view web pages. The media player application 610 configures the mobile device 102 to retrieve and play audio or audiovisual media. The Java applets 612 configure the mobile device 102 to provide games, utilities, and other functionality. The component 614 may be the first behavioral component 112 and/or the first authentication component 116, which enable behavioral authentication.

System Overview

Figure 7:
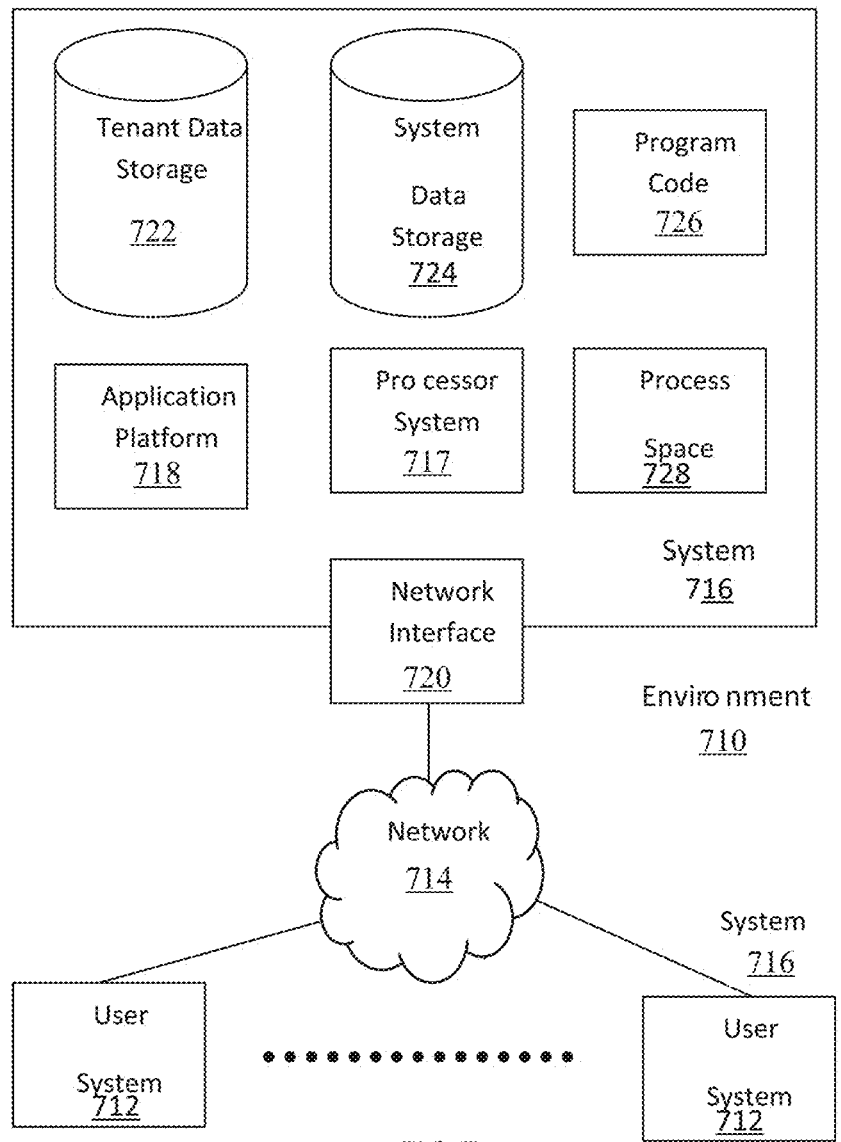
FIG. 7 illustrates a block diagram of an example of an environment wherein an on-demand database service might be used.

FIG. 7 illustrates a block diagram of an environment 710 wherein an on-demand database service might be used. The environment 710 may include user systems 712, a network 714, a system 716, a processor system 717, an application platform 718, a network interface 720, a tenant data storage 722, a system data storage 724, program code 726, and a process space 728. In other embodiments, the environment 710 may not have all of the components listed and/or may have other elements instead of, or in addition to, those listed above.

The environment 710 is an environment in which an on-demand database service exists. A user system 712 may be any machine or system that is used by a user to access a database user system. For example, any of the user systems 712 may be a handheld computing device, a mobile phone, a laptop computer, a work station, and/or a network of computing devices. As illustrated in FIG. 7 (and in more detail in FIG. 8) the user systems 712 might interact via the network 714 with an on-demand database service, which is the system 716.

An on-demand database service, such as the system 716, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 716" and the "system 716" will be used interchangeably herein. A database image may include one or more database objects. A relational database management system (RDMS) or the equivalent may execute storage and retrieval of information against the database object(s). The application platform 718 may be a framework that allows the applications of the system 716 to run, such as the hardware and/or software, e.g., the operating system. In an embodiment, the on-demand database service 716 may include the application platform 718 which enables creation, managing and executing one or more applications developed by the provider of the on-demand database service, users accessing the on-demand database service via user systems 712, or third party application developers accessing the on-demand database service via the user systems 712.

The users of the user systems 712 may differ in their respective capacities, and the capacity of a particular user system 712 might be entirely determined by permissions (permission levels) for the current user. For example, where a salesperson is using a particular user system 712 to interact with the system 716, that user system 712 has the capacities allotted to that salesperson. However, while an administrator is using that user system 712 to interact with the system 716, that user system 712 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 714 is any network or combination of networks of devices that communicate with one another. For example, the network 714 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 712 might communicate with the system 716 using TCP/IP and, at a higher network level, use other common Internet protocols to communicate, such as HTTP, FTP, AFS, WAP, etc. In an example where HTTP is used, the user systems 712 might include an HTTP client commonly referred to as a "browser" for sending and receiving HTTP messages to and from an HTTP server at the system 716. Such an HTTP server might be implemented as the sole network interface between the system 716 and the network 714, but other techniques might be used as well or instead. In some implementations, the interface between the system 716 and the network 714 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 716, shown in FIG. 7, implements a web-based customer relationship management (CRM) system. For example, in one embodiment, the system 716 includes application servers configured to implement and execute CRM software applications as well as provide related data, code, forms, webpages and other information to and from the user systems 712 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 716 implements applications other than, or in addition to, a CRM application. For example, the system 716 may provide tenant access to multiple hosted (standard and custom) applications, including a CRM application. User (or third party developer) applications, which may or may not include CRM, may be supported by the application platform 718, which manages creation, storage of the applications into one or more database objects and executing of the applications in a virtual machine in the process space of the system 716.

One arrangement for elements of the system 716 is shown in FIG. 7, including the network interface 720, the application platform 718, the tenant data storage 722 for tenant data 723, the system data storage 724 for system data 725 accessible to the system 716 and possibly multiple tenants, the program code 726 for implementing various functions of the system 716, and the process space 728 for executing MTS system processes and tenant-specific processes, such as running applications as part of an application hosting service. Additional processes that may execute on the system 716 include database indexing processes.

Several elements in the system shown in FIG. 7 include conventional, well-known elements that are explained only briefly here. For example, each of the user systems 712 could include a desktop personal computer, workstation, laptop, PDA, cell phone, or any wireless access protocol (WAP) enabled device or any other computing device capable of interfacing directly or indirectly to the Internet or other network connection. Each of the user systems 712 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 712 to access, process and view information, pages and applications available to it from the system 716 over the network 714. Each of the user systems 712 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 716 or other systems or servers. For example, the user interface device may be used to access data and applications hosted by the system 716, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 712 and all of its components are operator configurable using applications, such as a browser, including computer code run using a central processing unit such as an Intel Pentium® processor or the like. Similarly, the system 716 (and additional instances of an MTS, where more than one is present) and all of their components might be operator configurable using application(s) including computer code to run using a central processing unit such as the processor system 717, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring the system 716 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 716 is configured to provide webpages, forms, applications, data and media content to the user (client) systems 712 to support the access by the user systems 712 as tenants of the system 716. As such, the system 716 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 8:
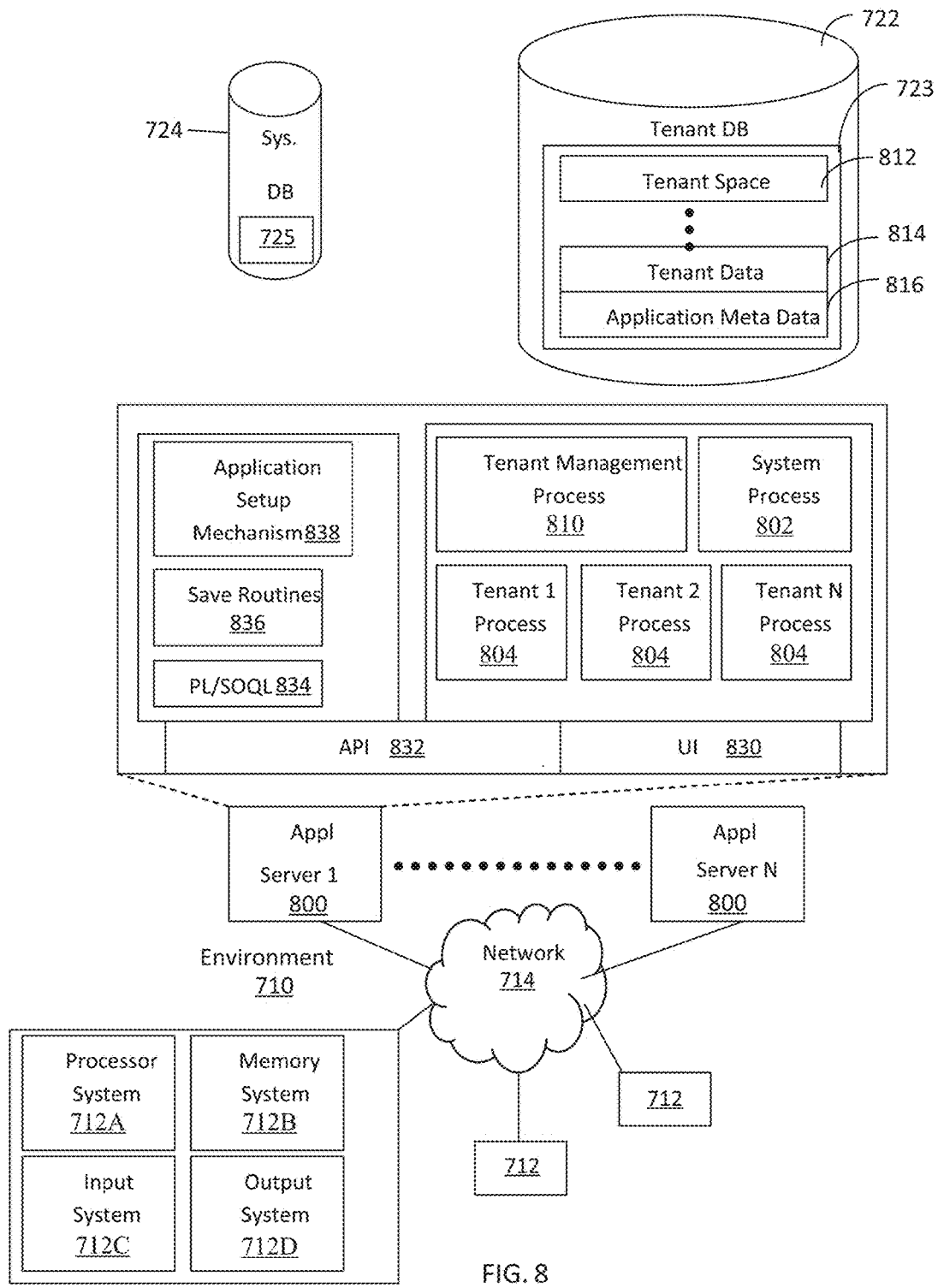
FIG. 8 illustrates a block diagram of an embodiment of elements of FIG. 7 and various possible interconnections between these elements.

FIG. 8 also illustrates the environment 710. However, in FIG. 8 elements of the system 716 and various interconnections in an embodiment are further illustrated. FIG. 8 shows that the each of the user systems 712 may include a processor system 712A, a memory system 712B, an input system 712C, and an output system 712D. FIG. 8 shows the network 714 and the system 716. FIG. 8 also shows that the system 716 may include the tenant data storage 722, the tenant data 723, the system data storage 724, the system data 725, a User Interface (UI) 830, an Application Program Interface (API) 832, a PL/SOQL 834, save routines 836, an application setup mechanism 838, applications servers 800₁-800$_N$, a system process space 802, tenant process spaces 804, a tenant management process space 810, a tenant storage area 812, a user storage 814, and application metadata 816. In other embodiments, the environment 710 may not have the same elements as those listed above and/or may have other elements instead of, or in addition to, those listed above.

The user systems 712, the network 714, the system 716, the tenant data storage 722, and the system data storage 724 were discussed above in reference to FIG. 7. Regarding the user systems 712, the processor system 712A may be any combination of one or more processors. The memory system 712B may be any combination of one or more memory devices, short term, and/or long term memory. The input system 712C may be any combination of input devices, such as one or more keyboards, mice, trackballs, scanners, cameras, and/or interfaces to networks. The output system 712D may be any combination of output devices, such as one or more monitors, printers, and/or interfaces to networks. As shown by FIG. 8, the system 716 may include the network interface 720 (of FIG. 7) implemented as a set of HTTP application servers 800, the application platform 718, the tenant data storage 722, and the system data storage 724. Also shown is the system process space 802, including individual tenant process spaces 804 and the tenant management process space 810. Each application server 800 may be configured to access tenant data storage 722 and the tenant data 723 therein, and the system data storage 724 and the system data 725 therein to serve requests of the user systems 712. The tenant data 723 might be divided into individual tenant storage areas 812, which can be either a physical arrangement and/or a logical arrangement of data. Within each tenant storage area 812, the user storage 814 and the application metadata 816 might be similarly allocated for each user. For example, a copy of a user's most recently used (MRU) items might be stored to the user storage 814. Similarly, a copy of MRU items for an entire organization that is a tenant might be stored to the tenant storage area 812. The UI 830 provides a user interface and the API 832 provides an application programmer interface to the system 716 resident processes to users and/or developers at the user systems 712. The tenant data and the system data may be stored in various databases, such as one or more Oracle™ databases.

The application platform 718 includes the application setup mechanism 838 that supports application developers' creation and management of applications, which may be saved as metadata into the tenant data storage 722 by the save routines 836 for execution by subscribers as one or more tenant process spaces 804 managed by the tenant management process 810 for example. Invocations to such applications may be coded using the PL/SOQL 834 that provides a programming language style interface extension to the API 832. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 816 for the subscriber making the invocation and executing the metadata as an application in a virtual machine.

Each application server 800 may be communicably coupled to database systems, e.g., having access to the system data 725 and the tenant data 723, via a different network connection. For example, one application server $800_1$ might be coupled via the network 714 (e.g., the Internet), another application server $800_{N-1}$ might be coupled via a direct network link, and another application server $800_N$ might be coupled by yet a different network connection. Transfer Control Protocol and Internet Protocol (TCP/IP) are typical protocols for communicating between application servers 800 and the database system. However, it will be apparent to one skilled in the art that other transport protocols may be used to optimize the system depending on the network interconnect used.

In certain embodiments, each application server 800 is configured to handle requests for any user associated with any organization that is a tenant. Because it is desirable to be able to add and remove application servers from the server pool at any time for any reason, there is preferably no server affinity for a user and/or organization to a specific application server 800. In one embodiment, therefore, an interface system implementing a load balancing function (e.g., an F5 Big-IP load balancer) is communicably coupled between the application servers 800 and the user systems 712 to distribute requests to the application servers 800. In one embodiment, the load balancer uses a least connections algorithm to route user requests to the application servers 800. Other examples of load balancing algorithms, such as round robin and observed response time, also can be used. For example, in certain embodiments, three consecutive requests from the same user could hit three different application servers 800, and three requests from different users could hit the same application server 800. In this manner, the system 716 is multi-tenant, wherein the system 716 handles storage of, and access to, different objects, data and applications across disparate users and organizations.

As an example of storage, one tenant might be a company that employs a sales force where each salesperson uses the system 716 to manage their sales process. Thus, a user might maintain contact data, leads data, customer follow-up data, performance data, goals and progress data, etc., all applicable to that user's personal sales process (e.g., in the tenant data storage 722). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 716 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 716 might also maintain system level data usable by multiple tenants or other data. Such system level data might include industry reports, news, postings, and the like that are sharable among tenants.

In certain embodiments, the user systems 712 (which may be client systems) communicate with the application servers 800 to request and update system-level and tenant-level data from the system 716 that may require sending one or more queries to the tenant data storage 722 and/or the system data storage 724. The system 716 (e.g., an application server 800 in the system 716) automatically generates one or more SQL statements (e.g., one or more SQL queries) that are designed to access the desired information. The system data storage 724 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system for behavioral authentication, the apparatus comprising:
   one or more processors; and
   a non-transitory computer readable medium storing a plurality of instructions, which when executed, cause the one or more processors to:
   record, by a mobile device, a first location of the mobile device;
   record, by the mobile device, a second location of the mobile device;
   determine, by the mobile device, whether a route from the first location to the second location matches an expected route from the first location to the second location by determining a matching score for the route and the expected route and whether the matching score satisfies a threshold;
   generate, by the mobile device, an access-enabling token in response to a determination that the matching score satisfies the threshold; and
   enable access, by the mobile device, to an entity by a user of the mobile device based on the mobile device providing the access-enabling token to an authentication component of the entity.

2. The system of claim 1, wherein recording the first location of the mobile device comprises recording a first time associated with the first location, and recording the second location of the mobile device comprises recording a second time associated with the second location.

3. The system of claim 2, wherein determining whether the route from the first location to the second location matches the expected route comprises at least one of comparing the first time against a starting time associated with the expected route, comparing the second time against an ending time associated with the expected route, and comparing a difference between the first time and the second time against a difference between the starting time and the ending time.

4. The system of claim 1, wherein the expected route is from the first location to the second location.

5. The system of claim 1, wherein determining whether the route from the first location to the second location matches the expected route comprises comparing both a first route from the first location to an intermediate location, and a second route from the intermediate location to the second location, against both a first expected route from a first expected location to an expected intermediate location, and a second expected route from the expected intermediate location to a second expected location.

6. The system of claim 1, comprising further instructions, which when executed, cause the one or more processors to enable access, by the mobile device, to another entity by a user of the mobile device based on the mobile device providing the access-enabling token to the other entity.

7. A computer program product comprising computer-readable program code to be executed by one or more processors when retrieved from a non-transitory computer-readable medium, the program code including instructions to:
   record, by a mobile device, a first location of the mobile device;
   record, by the mobile device, a second location of the mobile device;
   determine, by the mobile device, whether a route from the first location to the second location matches an expected route from the first location to the second location by determining a matching score for the route and the expected route and whether the matching score satisfies a threshold;
   generate, by the mobile device, an access-enabling token in response to a determination that the matching score satisfies the threshold; and
   enable access, by the mobile device, to an entity by a user of the mobile device based on the mobile device providing the access-enabling token to an authentication component of the entity.

8. The computer program product of claim 7, wherein recording the first location of the mobile device comprises recording a first time associated with the first location, and recording the second location of the mobile device comprises recording a second time associated with the second location.

9. The computer program product of claim 8, wherein determining whether the route from the first location to the second location matches the expected route comprises at least one of comparing the first time against a starting time associated with the expected route, comparing the second time against an ending time associated with the expected route, and comparing a difference between the first time and the second time against a difference between the starting time and the ending time.

10. The computer program product of claim 7, wherein the expected route is from the first location to the second location.

11. The computer program product of claim 7, wherein determining whether the route from the first location to the second location matches the expected route comprises comparing both a first route from the first location to an intermediate location, and a second route from the intermediate location to the second location, against both a first expected route from a first expected location to an expected intermediate location, and a second expected route from the expected intermediate location to a second expected location.

12. The computer program product of claim 7, wherein the program code comprises further instructions to enable access, by the mobile device, to another entity by a user of the mobile device based on the mobile device providing the access-enabling token to the other entity.

13. A method for behavioral authentication, the method comprising:

recording, by a mobile device, a first location of the mobile device;

recording, by the mobile device, a second location of the mobile device;

determining, by the mobile device, whether a route from the first location to the second location matches an expected route from the first location to the second location by determining a matching score for the route and the expected route and whether the matching score satisfies a threshold;

generating, by the mobile device, an access-enabling token in response to a determination that the matching score satisfies the threshold; and enabling access, by the mobile device, to an entity by a user of the mobile device based on the mobile device providing the access-enabling token to an authentication component of the entity.

14. The method of claim 13, wherein recording the first location of the mobile device comprises recording a first time associated with the first location, recording the second location of the mobile device comprises recording a second time associated with the second location, and determining whether the route from the first location to the second location matches the expected route comprises at least one of comparing the first time against a starting time associated with the expected route, comparing the second time against an ending time associated with the expected route, and comparing a difference between the first time and the second time against a difference between the starting time and the ending time.

15. The method of claim 13, wherein the expected route is from the first location to the second location.

16. The method of claim 13, wherein determining whether the route from the first location to the second location matches the expected route comprises comparing both a first route from the first location to an intermediate location, and a second route from the intermediate location to the second location, against both a first expected route from a first expected location to an expected intermediate location, and a second expected route from the expected intermediate location to a second expected location.

17. The method of claim 13, wherein the method further comprises enabling access, by the mobile device, to another entity by a user of the mobile device based on the mobile device providing the access-enabling token to the other entity.

* * * * *